Nov. 19, 1935.  I. D. KELLEY, JR., ET AL  2,021,603
COMPRESSED AIR GUN
Filed Aug. 13, 1934
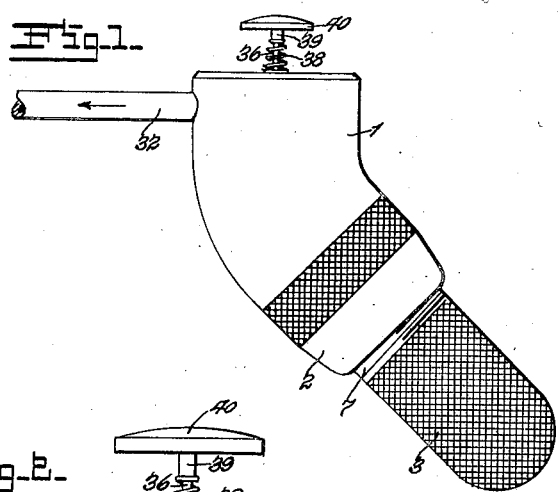
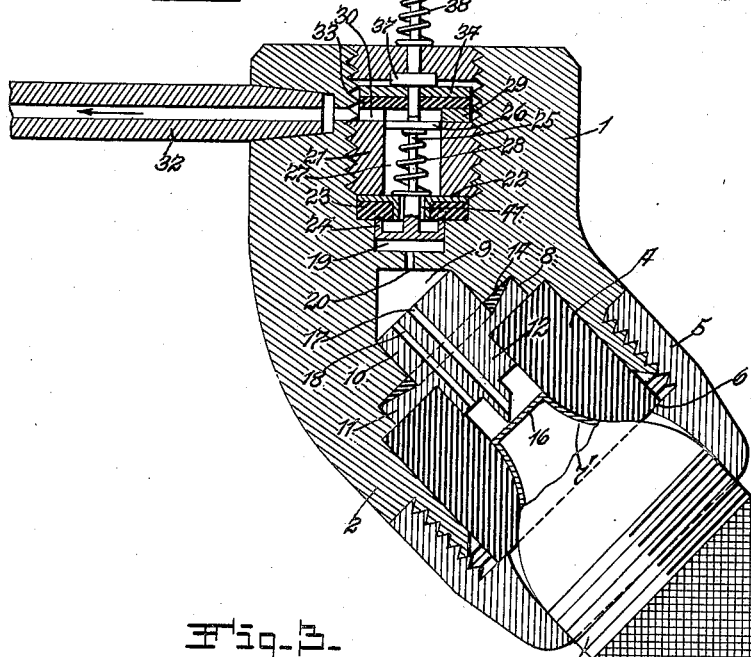
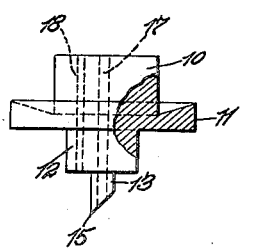
Inventors
Isaac Dee Kelley, Jr.
Marion L. J. Lambert
Calvin Latham
by Rumsey & Slingsland
Their Attorneys Patented Nov. 19, 1935

2,021,603

UNITED STATES PATENT OFFICE 2,021,603

COMPRESSED AIR GUN

Isaac Dee Kelley, Jr., and Marion L. J. Lambert, St. Louis, and Calvin Latham, St. Louis County, Mo.

Application August 13, 1934, Serial No. 739,612

3 Claims. (Cl. 221—73.5)

This invention relates to compressed air guns, and has special reference to portable instruments for use in controlling the discharge of compressed air from a container attached to and extending into the body of the instrument.

An object of the invention is to provide an improved portable compressed air gun having a body provided with a discharge passage and supporting valve mechanism for controlling the flow of discharged air through said passage, in combination with means for supporting a cartridge or shell filled with compressed air in connection with said body, and means for puncturing said cartridge or shell to provide an opening therefrom into said passage when said cartridge or shell and said body are relatively rotated.

Other objects will appear from the following description, reference being made to the accompanying drawing, in which—

Fig. 1 is a side elevation of our improved compressed air gun;

Fig. 2 is a greatly enlarged longitudinal sectional view; and

Fig. 3 is a side elevation, partly in section, of a combined puncturing, sealing and passage-forming element included in the invention.

Our improved portable compressed air gun comprises an angular body including a valve supporting portion 1 at one end and a portion 2 at the opposite end for supporting the cartridge or shell 3. Portions of the peripheral surfaces of the part 2 of the body and of the shell 3 may be knurled or spotted, so that they may be firmly held when relatively rotated to move said parts relatively, as hereinafter explained.

An elastic body 4 is mounted within the portion 2 of the body and is supported therein by a ring 5 screwed on to the threaded end of the portion 2 and having an internal shoulder 6 for engaging the end of the body 4.

The cartridge or shell 3 containing compressed air or gas is provided with circumferential threads 7 adapted to be screwed into and out of engagement with threads on the inside of the ring 5, beyond the shoulder 6. The cartridge or shell 3 has a tapered end portion 7' extending into the hollow elastic body 4 and expanding and compressing said body into the space between the shoulder 6 and the end of the body portion 2, in order to form a hermetic joint between said parts.

The angular body is formed with a recess, comprising a relatively large part 8 and a relatively small part 9 concentric therewith. The diameter of the part 8 of said recess is less than the diameter of the elastic body 4.

A combined puncturing, sealing and passage-forming element is mounted in the recess 8—9 and extends into the body 4. Said element comprises a cylindrical part 10 mounted in the part 9 of the recess, an annular flange 11 mounted in the part 8 of the recess, a cylindrical extension 12 mounted in the central opening in the body 4, and a puncturing tube 13 extending from the inner end of the extension 12. An elastic sealing gasket 14 is mounted in a concave recess in the flange 11 around the part 10. The inner end of the tube 13 is bevelled to provide a sharp cutting edge 15, which will cut through and puncture the outer end wall 16 of the cartridge or shell 3 when the shell is screwed far enough into the rung 5. The opening through the tube 13 opens through a passage 17 into the recess 9 beyond the outer end of the part 10. A passage 18 opens through the parts 10 and 12 to form communication from the space between the inner end of the part 12 and the end wall 16 of the cartridge or shell so as to permit any compressed air or gas to pass from said space to the outer end of the part 10.

A valve chamber 19 is formed in the body portion 1 and has communication with the cavity 9 through a port 20. The outer end of the body portion 1 is formed with an integrally threaded recess into which a plug 21 is screwed, the inner end of said plug pressing against a metallic compression washer 22 seated on a combined elastic sealing washer and valve seat 23 mounted in the inner end of said recess.

A valve, comprising an annular wall 24 mounted for loose longitudinal sliding movements in the valve chamber 19, is attached to the inner end of a valve stem 25. A disc 26, attached to the outer end of the valve stem 25, operates loosely in a hole 27 through the plug 21 and guides the valve and valve stem. A spring 28 encircles the stem 25 and has its inner end seated against the compression washer 22 and its outer end pressing against the disc 26 and is effective to close the valve 24 and hold the outer end thereof embedded or indented in the elastic sealing washer 23. When the valve is thus closed, it is impossible for the compressed air or gas to pass the valve.

A space ring 29 is seated against the outer end of the plug 21 and has an opening 30 through one side thereof communicating with an outlet passage 31 through the body portion 1. A tubular connecting device 32 has one end secured to the body portion 1 and communicating with the passage 31 and constitutes means whereby the compressed air or gas may be discharged and controlled as desired.

An elastic washer 33 is seated on the ring 29 and supports a metallic washer 34. A plug 35, screwed in the outer end of the body portion 1, supports and guides a valve stem 36, having its inner end slightly spaced from and in alignment with the outer end of the valve stem 25. An annular flange 37 is loose on the valve stem 36 and bears against the outer surface of the washer 34. A spring 38 encircles the valve stem 36 and has one end seated against the plug 35 and the opposite end engaging an enlargement 39 on the valve stem 36 and is effective to move said valve stem outwardly to its unoperated position. A knob or button 40 is attached to the outer end of the stem 36 for convenient engagement by the thumb or any one of the fingers in order to move the valve stem 36 inwardly in opposition to the spring 38.

To adapt the invention for use a shell or cartridge 3 containing compressed air or gas or the like is screwed into the end of the ring 5 with the end wall 16 of the shell or cartridge adjacent to but unpierced by the cutting edge 15 of the tube 13. The parts may be kept in this adjustment until it is desired to make use of the device. Then the shell or cartridge 3 is screwed further into the ring 5, causing the elastic body 4 to expand. The tube 13 cuts through the wall 16 of the shell or cartridge and extends into the shell or cartridge for a short distance, permitting the compressed air or gas to pass from the shell or cartridge through the tube 13 and the passage 17 to the space beyond the outer end of the part 10. Any compressed air or gas escaping from the shell or cartridge around the tube 13 may pass to the outer end of the part 10 through the part 18. From the cavity space 9 the compressed air or gas may pass through the port 20 into the valve chamber 19, but cannot escape from said chamber because of the sealing engagement of the combined valve seat and sealing washer 23 with the end of the valve 24 and with the body portion 1. When it is desired to discharge any of the compressed air or gas, the stem 39 is pressed inwardly in opposition to the spring 38 a distance sufficient to engage the outer end of the stem 25 and to move said stem 25 longitudinally to disengage the valve 24 from the combined valve seat and sealing gasket 23. This permits the compressed air or gas in the valve chamber 19 to pass around the valve 24 and thence around the valve stem 25, through the opening 41 and through the hole 27, around the disc 26 and outwardly through 30, 31 and 32. When the valve stem 39 is released, the spring 38 moves the same outwardly and the spring 28 moves the valve stem 25 outwardly and thereby moves the valve 24 into close sealing engagement with the combined elastic valve seat and sealing washer 23.

This invention may be applied to various uses and may be modified within the scope of the equivalent limits, without departure from the nature and principle thereof.

We claim:

1. A portable compressed air gun comprising a body having a passage therethrough, a valve for opening and closing said passage, an element mounted in said body and having a passage therethrough communicating with said passage through said body, a puncturing tube projecting from said element and opening into said passage through said element, an elastic body mounted in said first named body, a ring screwed on said first named body and pressing said elastic body against said element, a cartridge extending into said ring and having sealing engagement with said elastic body, and means for moving said cartridge longitudinally in said ring and causing said puncturing tube to puncture said cartridge.

2. A portable compressed air gun comprising a body having a passage therethrough and having a recess opening into said passage, an element mounted in said recess and having a passage therethrough opening into said recess, a puncturing tube projecting from said element opening into said passage through said element, an elastic body mounted in the end portion of said first named body and surrounding the outer end of said element, a flange integral with said element engaging the inner end of said elastic body, a ring screwed on the end of said first named body and holding said elastic body under compression, and a cartridge extending through said ring and against said elastic body and having an inner end wall puncturable by said puncturing tube.

3. A portable compressed air gun comprising a body having a passage therethrough and having a recess opening into said passage, an element mounted in said recess and having a passage therethrough opening into said recess, a puncturing tube projecting from said element opening into said passage through said element, an elastic body mounted in the end portion of said first named body and surrounding the outer end of said element, a flange integral with said element engaging the inner end of said elastic body, a ring screwed on the end of said first named body and holding said elastic body under compression, a cartridge extending through said ring and against said elastic body and having an inner end wall puncturable by said puncturing tube, and means for moving said cartridge longitudinally and causing said puncturing tube to puncture said inner wall of said cartridge when said cartridge is rotated in said ring.

ISAAC DEE KELLEY, Jr.
MARION L. J. LAMBERT.
CALVIN LATHAM.